United States Patent Office 3,119,748
Patented Jan. 28, 1964

3,119,748
PROCESS FOR 11-HYDROXYLATION OF STEROIDS
Carlos Casas-Campillo, Mexico City, Mex., assignor, by mesne assignments, to Syntex Corporation, a corporation of Panama
No Drawing. Filed Nov. 17, 1961, Ser. No. 153,241
Claims priority, application Mexico June 7, 1961
5 Claims. (Cl. 195—51)

The present invention relates to a new process for preparing certain cyclopentanoperhydrophenanthrene derivatives.

More specifically, it relates to a new method for introducing a hydroxyl group at the 11 position of steroidal compounds, by incubation with microorganisms of the Moniliaceae family, as described hereinafter in detail.

This method allows the conversion of androstane and pregnane derivatives into their $11\alpha$ and $11\beta$ hydroxylated derivatives. As is well known, such compounds are therapeutic agents per se, or may be intermediates for preparing other compounds of therapeutic value, since by oxidation they produce the corresponding 11-ketones. On the other hand, the $11\alpha$ and $11\beta$-hydroxy steroids obtained in accordance with our invention, may be converted by known methods into the $9\alpha$-halo-$11\beta$-hydroxy derivatives as well as into the $9\alpha$-halo-11-keto compounds.

Several microorganisms, especially those belonging to the Rhizopus genus, effect the introduction of an $11\alpha$-hydroxyl group into the steroidal molecule; however, sometimes the yields obtained are not very high, and furthermore, may cause hydroxylation at other positions, such as at C-6. The $11\beta$-hydroxylation by microorganisms is much less frequent than the $11\alpha$ and the yields obtained are not very high. This introduction of the $11\beta$-hydroxyl group has been achieved, for example, with *Cuninghamella blake sleeana*, *Streptomyces fradiae* and *Curvularia lunata*.

In accordance with the present invention, it has been found that microorganisms of the Moniliaceae family of the Arthrobotrys genus are capable of introducing an 11-hydroxy group both in the androstane and the pregnane series, without simultaneously hydroxylating other positions of the steroidal molecule.

As has been indicated previously, the method object of the present invention may be used for the $11\alpha$ and $11\beta$ hydroxylation of a great variety of steroids unsubstituted at C-11. Several types of side chain may be present at the 17 position, as well as other substituents such as keto groups, hydroxyls under the free or esterified form, halogens, methyl, acetals, ketals, etc. The starting compounds may be saturated or unsaturated at C-1, 2; C-4, 5 and/or C-5, 6.

Besides the free compounds, there may be employed as substrates the acetates or other esters, but in some cases the yields obtained are lower.

The method may be applied with good results for the introduction of an 11-hydroxy group using as substrates androstanedione, testosterone, pregnenolone, $17\alpha$-hydroxyprogesterone, $17\alpha$-hydroxy-$\Delta^1$-dehydroprogesterone, desoxycorticosterone, $\Delta^1$-dehydro-desoxycorticosterone, Reichstein's compound "S," $\Delta^1$-dehydro Reichstein's compound "S," as well as derivatives of the aforementioned compounds substituted at other positions, such as for example the 6-halo, $16\alpha$ or $16\beta$-methyl, $16\alpha$-hydroxy and $16\alpha,17\alpha$-acetonide compounds.

More particularly, the present invention relates to the conversion of Reichstein's compound "S," $6\alpha$-fluoro-"S," $6\alpha$-fluoro-$16\alpha$-methyl-"S," $16\alpha$-hydroxy-"S," $16\alpha$, $17\alpha$-acetonide of "S" and of the 1-dehydro analogs of such compounds, into a mixture of the $11\alpha$ and $11\beta$-hydroxy derivatives, the $\alpha$-isomer predominating and which may be separated by chromatography or oxidized directly to obtain the 11-keto compounds. On the other hand, by following the method described by Fried et al. (J. Am. Chem. Soc., 75, 2273 (1953)), both the $11\alpha$ and the $11\beta$-hydroxy compounds obtained in accordance with our invention may be converted into the corresponding $9\alpha$-fluoro-$11\beta$-hydroxy steroids, as well as into the corresponding 11-ketones, which as is well known, are also powerful anti-inflammatory agents.

As has been already mentioned, there are employed for the $11\alpha$ and $11\beta$ hydroxylation microorganisms of the Moniliales order of the Moniliaceae family, belonging to the Arthrobotrys genus. Of particular importance are the strains of the *A. oligospora*, *A. superba*, *A. cladodes*, *A. conoides*, *A. musiformis*, *A. dactyloides* and *A. robusta* species.

These microorganisms are described and characterized morphologically by Dreschler, C. in "Some Hyphomycetes that Prey on Free-Living Terricolous Nematodes," Mycologia, 29: 447–552 (1937).

The yields obtained by the method described in the present invention vary according to the starting material, the strain of microorganism employed, and other factors; however, generally yields of 35 to 50% are obtained of the $11\alpha$-hydroxy compounds and of 8 to 20% of the $11\beta$-isomers.

The process of the present invention may be carried out by first cultivating previously the microorganism in an adequate medium containing carbohydrates, salts and different sources of organic nitrogen. As sources of nitrogen there may be employed soya flour, corn flour, or commercial products such as Casitone (caseine hydrolyzate), Edamine (lactalbumine hydrolyzate), yeast extract, Phytone (papaic digest of soya meal, Baltimore Biol. Lab., Baltimore, Md.), Mycophil (soya bean hydrolyzate), Nutriet L-1 (lactalbumine hydrolyzate, Sheffield Farms, Norwich, New York), or N-Z-Amine (pancreatic hydrolyzate of caseine, Baltimore Biol. Lab., Baltimore, Md.).

In practice, the steroid is added under sterile conditions, either in crystalline form or in solution in an adequate solvent, such as acetone or ethanol for example, to a culture of the microorganism and the mixture is stirred in the presence of air, in order to facilitate the growth of the microorganism and the oxygenation of the substrate. Alternatively, the culture medium can be seeded under sterile conditions with a culture of the microorganism and simultaneously, or when the growth of the organism has been initiated, adding the steroid. In some cases it is recommended to add the steroid when the microorganism has completed its growth.

There may also be employed enzymatic preparations of the growth of the oxygenating microorganism.

The method which gives the best results is that in which the microorganism is previously grown in an adequate culture medium, under aerobic conditions and in the absence of the steroid; the growth obtained is separated from the medium by filtration, and, if desired, it is washed with distilled water. The mycelium thus obtained is then suspended in water in which the steroid to be hydroxylated had been previously suspended and the mixture is stirred with aeration for a period of time between 12 and 78 hours; at the end of this time the reaction products are isolated by extraction with an adequate solvent.

In general, it is recommended a steroid concentration of 5% with respect to the total weight of the substrate, although other concentrations may be employed. Taking into account that the solubility of the steroidal compounds in water is very low, the oxygenation in some cases may be very slow; however, the degree of subdivision of the steroid when added to the oxygenating system, which may be either a culture of the microorganism or an enzymatic system, seems to have no effect on the yield or in the nature of the products.

When a solution of the steroid in a solvent miscible with water is added to an aqueous fermentation system, in the presence of a great excess of water, the steroid generally precipitates in very fine form; however, this method does not seem to favor appreciably the speed of the reaction as compared with the addition of relatively larger crystals of the steroid.

When the oxygenation process is complete, the product may be recovered from the mixture by extraction with a solvent non-miscible with water; adequate solvents for this purpose are: chlorinated hydrocarbons, alcohols and ketones, particularly for example, chloroform, methylene chloride, carbon tetrachloride, ethylene chloride, and similar solvents; particularly good results are obtained when the extraction of the product is carried out with hot ethylene chloride, at a temperature between 40 and 80° C.; the extract containing the reaction products and unchanged starting material can be reduced to a small volume or evaporated to dryness, thus obtaining a solid product which is purified by different methods, the most common being chromatography and crystallization.

The following specific examples serve to illustrate but are not intended to limit the scope of the invention:

*Example I*

A culture of *Arthrobotrys superba* var. *oligospora* ATCC 11572 was prepared in a mycophil-agar or malt-agar medium to maintain this microorganism.

After 1 week of incubating this microorganism at 25° C., there was formed a superficial growth which was suspended in 5 ml. of sterile water. 1 ml. of this suspension was employed to inoculate 100 Erlenmeyer flasks containing 25 ml. of the following culture medium:

Phytone _____ g__ 10
Glucose _____ g__ 10
Distilled water _____ ml__ 1000

These cultures were cultivated under rotatory stirring at 25–28° C. for 2 to 4 days, until an abundant growth was obtained; to each flask there was added 5 mg. of Reichstein's compound "S" and the incubation was continued for 48 hours longer, at the end of which the contents of the flasks were extracted several times with methylene chloride; the extract was washed with water, dried over anhydrous sodium sulfate and evaporated to dryness under reduced pressure. The residue was adsorbed in a column charged with 15 g. of silica.

The first fractions eluted with ether-benzene (2/3) produced 60 mg. of $\Delta^4$-pregnene-11$\beta$,17$\alpha$,21-triol-3,20-dione (compound "F"). In the more polar fractions (ether-benzene, 3/2) there was eluted $\Delta^4$-pregnene-11$\alpha$,17$\alpha$,21-triol-3,20-dione (11-epi compound "F"), obtaining 215 mg. of the latter compound.

*Example II*

In the preceding example there was substituted in the culture medium as source of nitrogen the Phytone by soya flour, thus obtaining also as final products hydrocortisone and 11-epi-hydrocortisone with similar yields.

*Example III*

In accordance with the method described in Example I, 16$\alpha$-methyl-$\Delta^4$-pregnene-17$\alpha$,21-diol-3,20-dione was converted into 16$\alpha$-methyl-$\Delta^4$-pregnene-11$\beta$,17$\alpha$,21-triol-3,20-dione and 16$\alpha$-methyl-$\Delta^4$-pregnene-11$\alpha$,17$\alpha$,21-triol-3,20-dione; 6$\alpha$ - fluoro - 16$\alpha$-methyl-$\Delta^4$-pregnene-17$\alpha$,21-diol-3,20-dione afforded the 6$\alpha$-fluoro-16$\alpha$-methyl-$\Delta^4$-pregnene-11$\alpha$ and 11$\beta$,17$\alpha$,21-triol-3,20-diones; and 6$\alpha$-fluoro-$\Delta^4$-pregnene-16$\alpha$,17$\alpha$,21-triol-3,20-dione produced the 6$\alpha$-fluoro - $\Delta^4$-pregnene-11$\alpha$ and 11$\beta$,16$\alpha$,17$\alpha$-21-tetrol-3,20-diones.

*Example IV*

By essentially following the method described in Example I, but substituting the Phytone by Edamine (lactalbumine hydrolyzate) there was incubated 500 mg. of the 16,17-acetonide of $\Delta^{1,4}$-pregnadiene-16$\alpha$,17$\alpha$,21-triol-3,20-dione, thus furnishing the respective 11$\alpha$ and 11$\beta$-hydroxy-isomers, which were separated by chromatography on silica; there was obtained 35–40% yield of the first and 8–10% of the second.

*Example V*

There was prepared a growth of *Arthrobotrys conoides* ATCC 11316 in the culture medium described in Example I.

To each of 100 Erlenmeyer flasks containing 50 ml. of this culture was added 10 mg. of 6$\alpha$-fluoro-compound "S," and stirred (rotatory stirring) at 25–28° C. for 60 hours. The contents of the flasks were combined and the organic steroidal product was extracted wtih methylene chloride; the extract was washed with water, dried over anhydrous sodium sulfate and evaporated to dryness under vacuum. The residue was purified by chromatography on silica gel. There were thus obtained 6$\alpha$-fluoro-11-epi-hydrocortisone (33% yield) and 6$\alpha$-fluoro-hydrocortisone (7% yield).

*Example VI*

By following the method of Example I, but changing the Phytone by Mycophil (hydrolyzate of soya protein); the microorganism of the *Arthrobotrys dactyloides* species was cultivated in this medium together with 500 mg. of 16$\alpha$ - methyl-$\Delta^4$-pregnene-17$\alpha$,21-diol-3,20-dione; finally, after chromatography, there were obtained 16$\alpha$-methyl-$\Delta^4$ - pregnene - 11$\beta$,17$\alpha$,21-triol-3,20-dione and its 11$\alpha$-isomer.

I claim:

1. A process for the production of an 11$\alpha$-hydroxylated steroid comprising subjecting a steroid selected from the group consisting of the 11-desoxy pregnane series and the 11-desoxy androstane series to the oxygenating action of enzymes produced by a microorganism of the genus Arthrobotrys.

2. The process of claim 1 wherein the microorganism is of the species *Arthrobotrys superba* var. *oligospora*.

3. The process of claim 1 wherein the microorganism is of the species *Arthrobotrys conoides*.

4. The process of claim 1 wherein the microorganism is of the species of *Arthrobotrys dactyloides*.

5. A process for the preparation of a compound selected from the group consisting of hydrocortisone and 11-epi-hydrocortisone comprising subjecting $\Delta^4$-pregnene-17$\alpha$,21-diol-3,20-dione to the oxygenating action of enzymes produced by a microorganism of the genus arthrobotrys.

References Cited in the file of this patent

UNITED STATES PATENTS 3,013,945     Ilavsky et al. _____ Dec. 19, 1961